Feb. 23, 1954  E. VAN DE WALLE ET AL  2,669,806
FEEDER FOR MOLTEN GLASS
Filed Dec. 8, 1951  3 Sheets-Sheet 1
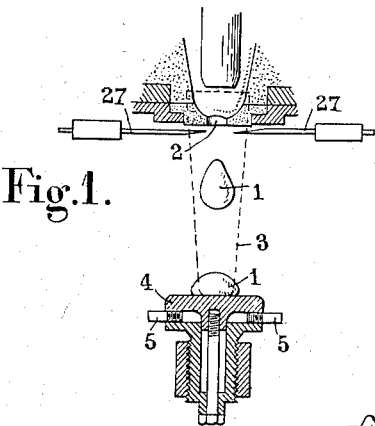
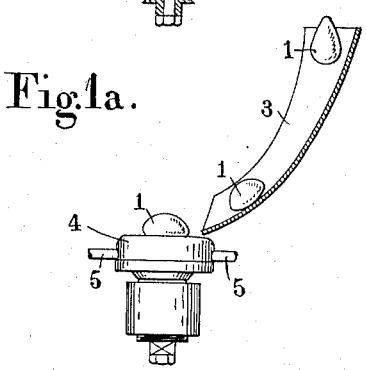
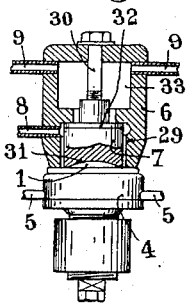
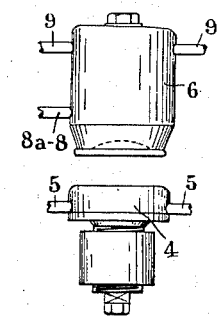
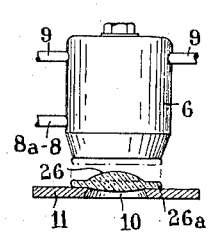
INVENTORS:
EDMOND VAN DE WALLE,
CHARLES VAN DE WALLE AND
EMILE BONNEFOY
BY:

Feb. 23, 1954     E. VAN DE WALLE ET AL     2,669,806
FEEDER FOR MOLTEN GLASS

Filed Dec. 8, 1951     3 Sheets-Sheet 2

INVENTORS:
EDMOND VAN DE WALLE,
CHARLES VAN DE WALLE AND
EMILE BONNEFOY
BY:

Feb. 23, 1954　　　E. VAN DE WALLE ET AL　　　2,669,806
FEEDER FOR MOLTEN GLASS
Filed Dec. 8, 1951　　　　　　　　　　　　3 Sheets-Sheet 3
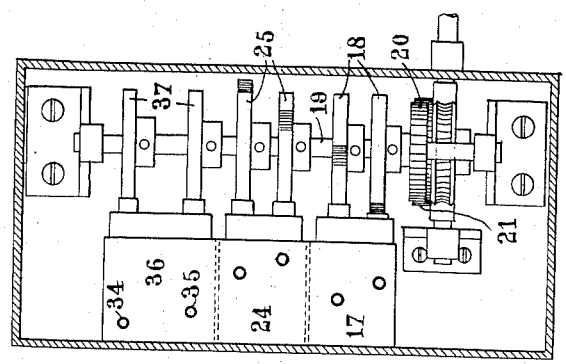
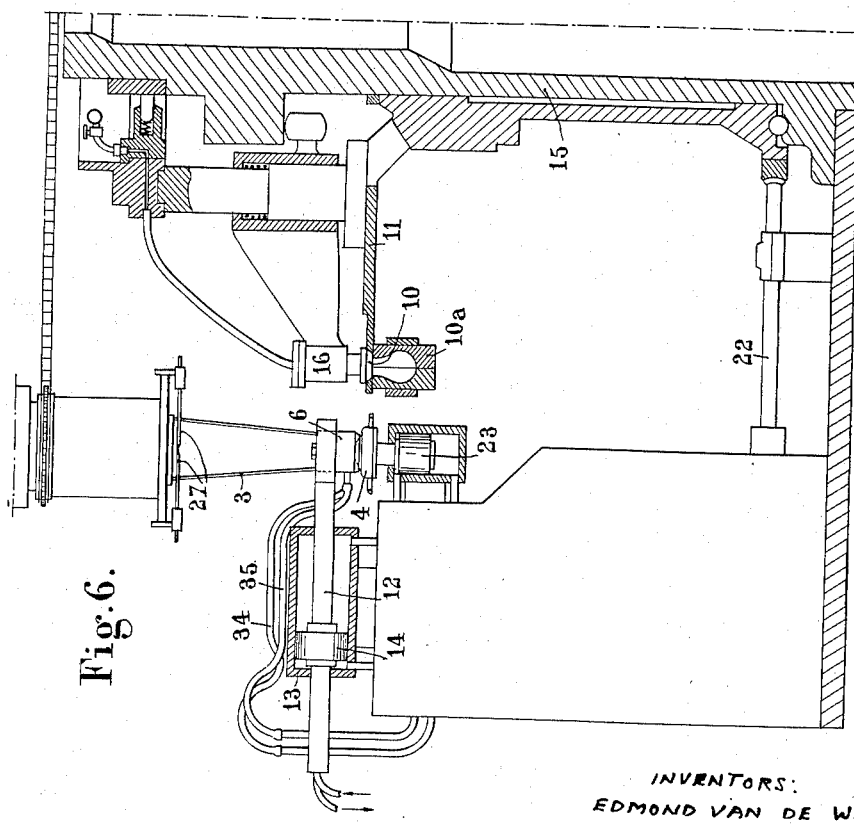
INVENTORS:
EDMOND VAN DE WALLE,
CHARLES VAN DE WALLE, AND
EMILE BONNEFOY Patented Feb. 23, 1954

2,669,806

UNITED STATES PATENT OFFICE 2,669,806

FEEDER FOR MOLTEN GLASS

Edmond Van de Walle, Neuilly-sur-Seine, Charles Van de Walle, Paris, and Emile Bonnefoy, La-Varenne-Saint-Hilaire, France Application December 8, 1951, Serial No. 260,692

Claims priority, application France December 31, 1948

6 Claims. (Cl. 49—5)

1

This application is a continuation-in-part of the U. S. Patent application Ser. No. 135,418, filed on December 28, 1949, and now abandoned.

It is a well-known fact that the machines used for the production of glass objects are fed by means of distributors of molten glass generally called feeders, which latter deposit automatically into a mold or on the casting table a predetermined amount of molten glass corresponding to the amounts required for the production of the objects considered. But it is very difficult with the arrangements used heretofore, to measure exactly the amount of glass distributed for each operation, on one hand and to center correctly said mass of glass with reference to the opening in the casting table through which it is to be brought under the action of the blowing means, on the other. Furthermore, the transportation of the mass of glass from the receiving station up to the operating station is also a source of considerable difficulty.

This invention relates to improvements to the feeding device of rotary machines for the blowing of articles such as lamp bulbs, flasks, or other thin hollow articles, in which machines the gobs of glass are delivered on successive blowing ports distributed around a rotative work-table, then blown by the means of movable blowing heads into molds located below said ports. The rotary machine may be for example of the general type such as described in the U. S. Patent No. 2,405,557 but without any stamping device of the molten glass on the rotary part of the machine.

Preferably, the delivery of gobs is effected according to such a method as described in the same U. S. Patent specification No. 2,405,557, which method consists in delivering the gob in such a manner that the bulb or other ware is made from the central part of said gob, and that both severed ends of the gob are in the part thereof which goes to cullet, that is in a chilled ring of glass which remains on the upper part of the table so as to support the glassware during the blowing thereof and which is cut off when once the glassware has been blown and is to be ejected from the turret machine. With this end in view, the gobs are dropped on to an incurved chute, so as to be delivered on to the receiver with their long axis in a horizontal position instead of vertical.

2

The improvements provided according to my invention have for their object to produce a feeder allowing measuring and accurately centering in its operative position the amount of molten glass required for each operation while ensuring its transportation from its casting and spreading point up to its point of drawing and blowing on the casting table or up to the parison mold.

This improved feeder comprises chiefly a movable head adapted to sink over the mass of glass laid on the receiver plate and inside which may be exerted under the operator's control alternatively a reduced pressure for spreading and flattening out said mass of glass and allowing its subsequent transportation, and an increased pressure for correctly positioning the mass above the drawing and blowing port on the casting table.

The arrangement is advantageously associated with a water cooling system for the head of the feeder and the glass-receiver plate in order to provide for the protection of said parts and to allow an easier subsequent loosening of the glass.

We have illustrated by way of example in accompanying drawings a preferred embodiment of the improved feeder according to our invention, said embodiment being illustrated in its successive operative positions. In said drawings:

Figs. 1 and 1a of the drawings are two vertical views perpendicular to one another of the arrangement as the molten glass sinks onto the receiver plate.

Fig. 2 is a view of the movable feeder head when cooperating with said receiver plate for spreading out the glass.

Fig. 3 shows the receiver plate at the beginning of its downward motion under the movable head ready for transportation of the glass mass.

Fig. 4 illustrates the head when in vertical register with the glass drawing port after it has laid on the casting table the suitably shaped and flattened-out mass of glass.

Fig. 6 is a diagrammatical view in which the movable head is shown in register with the receiver plate.

Fig. 7 is a plan view of the camshaft of the feeding device, and of the organs controlled by said camshaft.

Figure 5:
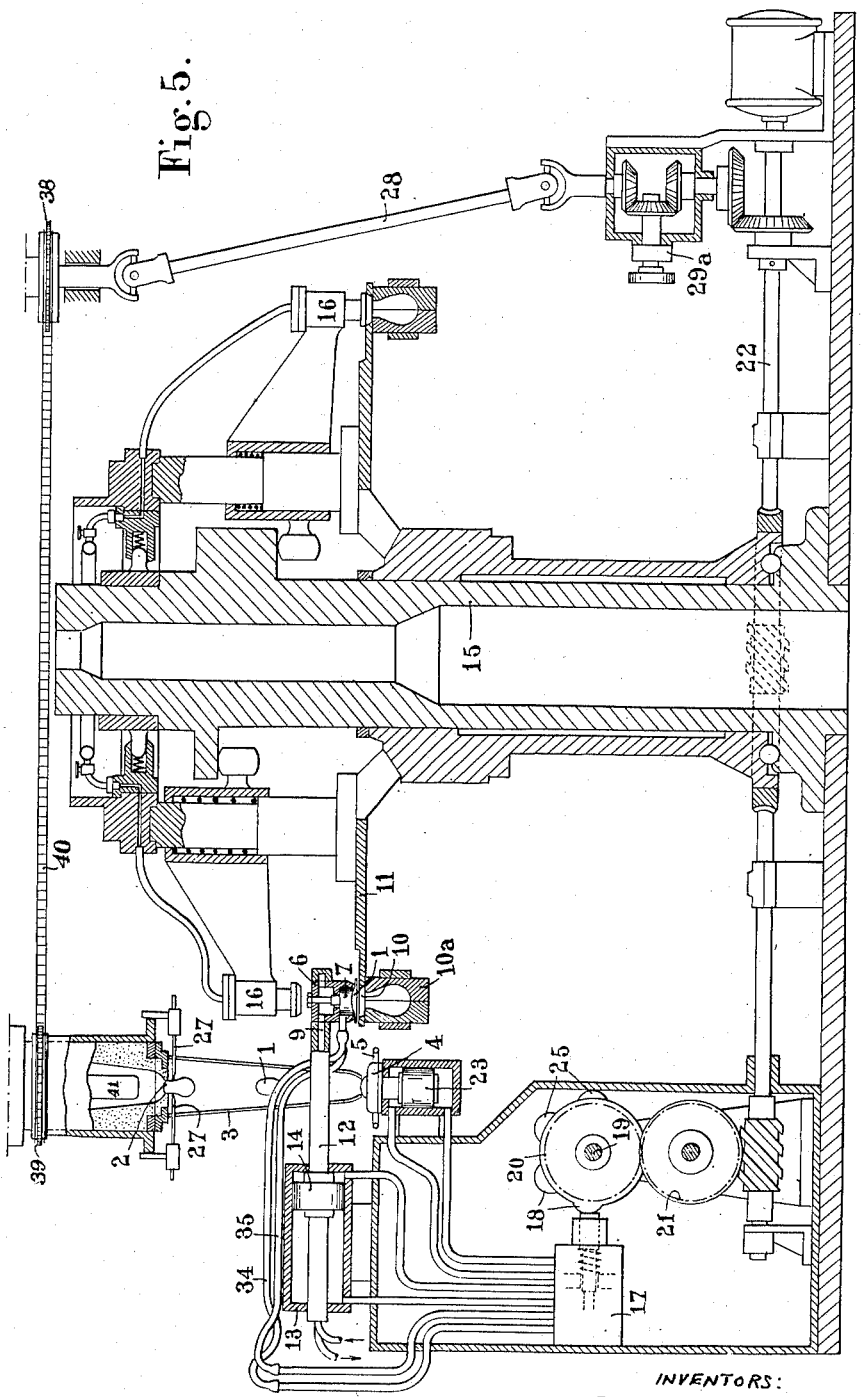
Fig. 5 is an elevational view of the feeding device, the movable head being shown in vertical register with a port of the work table of the molding machine.

As apparent from inspection of Figs. 1 to 4, the glass mass 1 falling in measured amounts from the casting spout 2 opening out of the hearth of the melting furnace is guided by a channel 3 onto the receiver or operating plate of the machine. Said plate 4 is preferably cooled by a circulation of water 5 as illustrated.

A movable hollow head 6 is mounted for horizontal reciprocation on a horizontal arm 12 which is slidable in a cylinder 13 provided with a plunger piston 14. This arm 12 is directed according to a radial line of the rotary machine 15 to be fed. This rotary machine is diagrammatically shown on Fig. 5. It comprises a worktable 11 provided with blowing-ports 10 regularly distributed around, said work table being actuated in continuous rotation by a driving shaft 22; shiftable blowing heads 16 are provided on said working-table in the vicinity of the blowing ports 10, and molds 10a are provided under said ports 10. The admission of pressure air into the cylinder 13 is controlled by an air valve 17 which is actuated by cams 18 of a camshaft 19. This camshaft is driven through gears 20, 21 by the actuating shaft 22 of the rotary machine 15. The gear ratios between the different rotative organs are such that for a rotation of the work plate 11, the camshaft 19 effects $n$ rotations, $n$ being the number of blowing-ports 10 distributed around the work-table 11. The arm 12, which carries the movable head 6 is situated just above the level of the work table 11, and is longitudinally reciprocated under the control of cams 18 and pressure-air valves 17, with a short station at each one of the extreme positions.

The receiver plate 4 is slidably reciprocable according to a vertical direction, and the reciprocation of this plate is effected, in the same way as that of head 6, by an air operated plunger 23 controlled by an air valve 24 actuated by cams 25 of the camshaft 19. Said receiver plate 4 is in vertical register with the furthermost position of the reciprocable head 6 in relation with the work table 11 (see Fig. 6). The opposite extreme position of head 6 is located just above the circular path of the ports 10 of the work plate 11 (see Fig. 5). The cams 18 which control the reciprocation of arm 12 and head 6, are set on the camshaft 19 in such angular positions that head 6 is stationary in the latter extreme position at the moment when one of the $n$ ports 10 is passing under that extreme position.

In its lowermost position, the receiver plate 4 is in register with the end of chute 3 for receiving the gobs 1. The control cams 25 of the plunger 23 are set on the shaft 19 in such an angular position that plunger 23 and plate 4 stay for a moment in their lowermost position for receiving the gob 1 and are quickly lifted up to their uppermost position so as to arrive at said position just at the moment when the head 6 is stationary in its corresponding extreme position. In this register position of head 6 and plate 4, a determined and constant short distance remains between the lower edge of head 6 and the upper face of plate 4, due to the construction itself of the device. In this way, the gob 1 is stamped between plate 4 and head 6 so as to be shaped into a bulky central mass 26 surrounded by a flat ring 26a of glass integral with said central mass. This ring 26a is quickly chilled whereas the central mass remains at higher temperature and is still in the molten state when the stamped gob is subsequently transported on to the blowing-port of the work-table 11. It is to be noted that if the gob 1 is delivered on the receiver plate 4 by the means of an incurved chute 3 so as to have its longitudinal axis in horizontal position, the severed end of the gob 1 is at the periphery of the same when stamped between head 6 and table 4, and is thus incorporated in the ring 26a destined to be cut off from the hollow blown object.

Two shearing blades 27 are provided just under the discharge orifice of the forehearth which contains the molten glass, and these shearing blades are periodically actuated by means of a Cardan shaft 28, of sprocket-wheels 38, 39 and -chain 40, and of cam-and-follower mechanisms (not shown) actuated by the sprocket-wheel 39 and destined to produce both a vertical reciprocation of a feeding plunger 41 and opposite reciprocations of the shearing-blades 27 in synchronism with the vertical reciprocation of said plunger so as to cut off and deliver successive gobs 1 with the same period as the reciprocating motions of head 6 and plate 4. Such a delivery mechanism of gobs is described in detail in applicant's U. S. patent application Serial No. 778,936 now abandoned. The shaft 28 is driven by the driving shaft 22 of the rotary machine 15, with such a gear ratio that when the work-table 11 performs a rotation, the shearing blades are actuated $n$ times. Moreover means 29a are provided in this transmission device for adjusting exactly in time the moment when the shearing operation is effected, in view of the lapse of time which takes place between the severing of the gob and the moment when the gob arrives on the receiver plate 4. If the conditions of temperature of the molten glass and the composition of said glass are invariable, the gobs delivered by such a device are nearly constant in weight. In spite of this approximate invariability, the exact constancy of the weight of the glass objects results from the nature of the mechanism, as further described and explained.

The movable hollow head 6 is provided with a wide vertical bore 29, in which is held, by the means of a threaded stem 30 an inner block 7 that assumes a suitable concave outline 31 so as to give to the glass mass 1 the desired shape as illustrated in Fig. 2. Besides, the position of said block 7 may be adjusted longitudinally inside the movable head 6 in accordance with the volume of molten glass to be fed in the operations; this adjustment is effected by inserting, between the upper part of block 7 and the upper end of bore 29, one or several less or more thick gaskets 32 providing a tight separation between the bore 29, which is destined to be connected with an external source of vacuum, and the upper chamber 33 which is provided for the circulation of cooling water. A reduced pressure, as produced by a pump or any like external source of vacuum can be exerted through the pipe 8 inside the movable head 6 and around the member 7. An air pressure may be exerted in the same way through the pipe 8a. Cooling means including a pipe 9 for the circulation of water inside chamber 33 are provided inside the movable head 6 so as to prevent an excessive heating thereof. The pipes 8 and 8a are connected through flexible ducts 34, 35 respectively with a vacuum source and with pressure air. A conventional valve 36, adapted for stopping either one of these ducts, or both, is controlled by cams 37 of the camshaft 19. These cams 37 are set on said shaft 19 in such angular positions that, on the one hand, vacuum begins to be exerted in head 6 when this latter arrives at its extreme position above plate 4, and continues to be exerted as long as head 6 is translated up to the opposite extreme position, and that in the other hand, a sudden air-pressure is exerted just at the time when a port 10 of the work-table 11 is passing under head 6; no more vacuum or pressure being exerted when head 6 is coming back from this latter extreme position to the first one.

The mechanism operates as follows:

Under the mechanical action of the movable head, associated with the action of inner depression, the mass of glass 1 is suitably spread, flattened out and shaped over the receiver plate 4.

The reduced pressure continuing its action inside the movable head 6, the latter carries along with it, by reason of the suction exerted inside it, the suitably flattened mass of glass as shown in Fig. 3.

As soon as the head 6 has arrived into vertical register with a drawing out port 10 of the work-table 11, the reduced pressure is no longer allowed to act inside the movable head and in its stead compressed air is caused to act and is admitted to this end through the pipe 8a (Fig. 4). Under the action of the compressed air thus admitted into the head 6, the suitably shaped mass of glass is expected from the lower part of the head 6 and drops onto the table 11 on which said head 6 is in perfect vertical register with one of the drawing-out ports 10 of the casting table, due to the angular position of the cams 37; the mass of glass is then carried along in its rotary movement, by the casting table 11, in order to be submitted to the successive operations required in the production of the final object to be molded.

During said succession of operations, the movable head assumes a longitudinal displacement and, in association with the continuous rotary movement of the casting table of the machine produces the required relative movement of said head with reference to the blowing ports equally distributed around the table in order to obtain their correct relative positioning, as illustrated in Figs. 5 and 6.

It should be readily understood that the mass of glass thus distributed on the successive portions of the casting table and constituted by an exactly predetermined weight of material, is perfectly shaped, defined and annularly trimmed on said table whereby the glass objects produced with said mass will assume a perfectly constant weight and their mechanical production allows thus ensuring perfect regularity in the production.

The constancy of weight of material in the different objects formed on the casting table 11 results indeed from the constancy of the distance comprised between the upper surface of the receiver 4 and the lower edge of the movable head 6 when these two organs are in register with each other. If the weight of the gobs to be stamped therebetween happens to vary slightly, the excess or the shortage in weight produces a variation in breadth of the flat ring 26a of the stamped gob whereas the central portion 26 of the gob contains a constant weight of material determined by the constant volume remaining between the concave surface 31 and the upper part of the receiver 4. And the only central portion 26 is used for constituting the blown glassware, the ring 26a being quickly chilled, and being cut off from the glassware when this latter is to be ejected from the work-table 11. On the other hand, the member or block 7 inside the movable head 6 may assume, according to the object to be produced, the desired outline as required for ensuring a suitable distribution of glass corresponding to the final shape to be given to the object.

Obviously the details of execution disclosed hereinabove, are to be construed solely as an exemplification and by no means in a binding sense, the invention being capable of many modifications within the scope of accompanying claims.

What we claim is:

1. A glass blowing machine comprising a rotating working table having blowing ports circularly and regularly distributed thereon, a device for delivering gobs of molten glass onto said ports, said device comprising a receiver mounted for reciprocation between a lower and an upper position, means for delivering successive gobs of molten glass onto said receiver when this latter is in its lower position, a head having a cavity at its lower part and mounted for horizontal reciprocation between a first extreme position in vertical register with the receiver but spaced a short distance above the upper position of said receiver and a second extreme position in vertical register with the circular path of the blowing-ports of the machine, means for exerting a suction in the cavity of the head and thereby retaining in the same a gob of molten glass, means for exerting pressure in said cavity and thereby ejecting said gob from said head, and means for periodically and selectively actuating said gob delivering means, said reciprocable receiver, said reciprocable head, said suction-means and said pressure-means, in synchronism with the rotative motion of the working table of the machine.

2. A glass blowing machine comprising a rotating working table having blowing ports circularly and regularly distributed thereon, and a device according to claim 1, the head having a vertical bore and a block fixed in said bore and provided with a cavity at its lower end.

3. A glass blowing machine comprising a rotating working table having blowing ports circularly and regularly distributed thereon, a device for delivering gobs of molten glass onto said ports, said device comprising a movable head having a cavity at its lower part and mounted for horizontal reciprocation between a first extreme position above the circular path of the blowing ports and a second extreme position outside the working table, a receiver reciprocable between a lower and an upper position and adapted for stamping cooperation in its upper position with the lower part of said head when this latter is in its second extreme position, the head and receiver being spaced a short distance when said head is in said second position, means for delivering gobs of molten glass onto said receiver when in its lower position, means for exerting a suction in the cavity of the head and thereby retaining in the same a gob of molten glass, means for exerting a pressure in said cavity and thereby ejecting said gob from said head, and means for periodically and selectively actuating said gob-delivering means, said receiver, said head, said suction-means and said pressure means, in synchronism with the rotative motion of the working table.

4. A glass blowing machine comprising a rotating working table having blowing ports circularly and regularly distributed thereon, and a device according to claim 3, the head having a vertical bore and a block fixed in said bore and provided with a cavity at its lower end.

5. A glass blowing machine comprising a rotating working table having blowing ports circularly and regularly distributed thereon, a device for delivering gobs of molten glass onto said ports, said device comprising a movable head having a cavity at its lower part and mounted for reciprocation between a first extreme position above the circular path of the blowing ports and a second extreme position outside the working-table, a receiver reciprocable between two extreme positions and adapted for stamping cooperation in one of its extreme positions with the lower part of said head when this latter is in its second extreme position, the head and receiver being spaced a short distance when said head is in said second position, means for delivering gobs of molten glass onto said receiver when in its other extreme position, means for exerting a suction in the cavity of the head and thereby retaining in the same a gob of molten glass, means for exerting a pressure in said cavity and thereby ejecting said gob from said head, and means for periodically and selectively actuating said gob-delivering means, said receiver, said head, said suction means and said pressure means, in synchronism with the rotative motion of the working-table.

6. A glass blowing machine comprising a rotating working table having blowing ports circularly and regularly distributed thereon, and a device according to claim 5, the head having a vertical bore and a block fixed in said bore and provided with a cavity at its lower end.

EDMOND VAN DE WALLE.
CHARLES VAN DE WALLE.
EMILE BONNEFOY.

References Cited in the file of this patent

UNITED STATES PATENTS

| Number | Name | Date |
|---|---|---|
| 1,260,637 | Canfield | Mar. 26, 1918 |
| 1,271,961 | Teeple | July 9, 1918 |
| 1,415,824 | Ferngren | May 9, 1922 |
| 1,845,491 | Eckert | Feb. 16, 1932 |
| 1,845,525 | Sloan | Feb. 16, 1932 |
| 2,405,557 | Bonnefoy-Cudraz | Aug. 13, 1946 |